Figure 2:
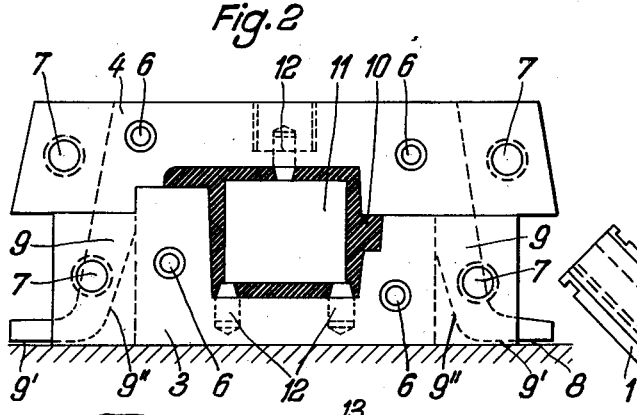

April 30, 1963　　　G. A. STYRA　　　3,087,207
FRAMES, SPECIFICALLY WINDOW-FRAMES, DOOR-FRAMES, AND KINDRED
FRAMES, AS WELL AS APPARATUS AND PROCESSES
FOR THE MANUFACTURE THEREOF
Filed Oct. 31, 1957　　　7 Sheets-Sheet 1

Inventor:
G. A. Styra

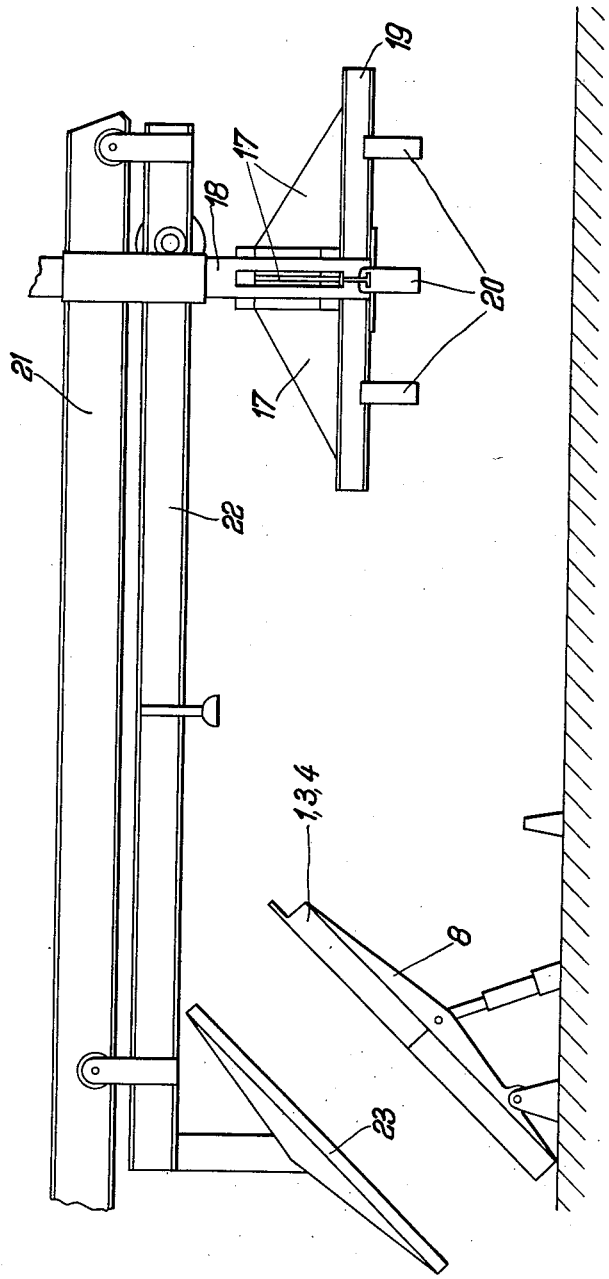

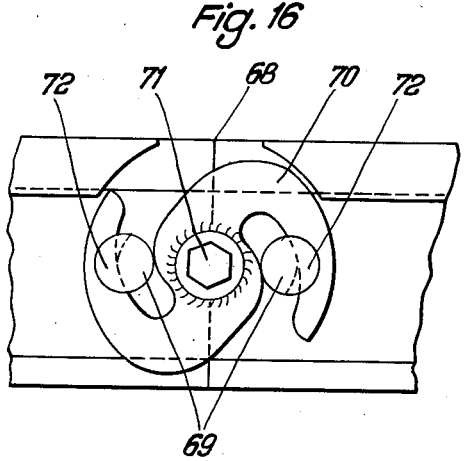
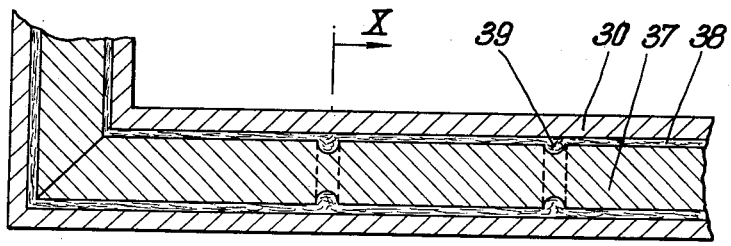
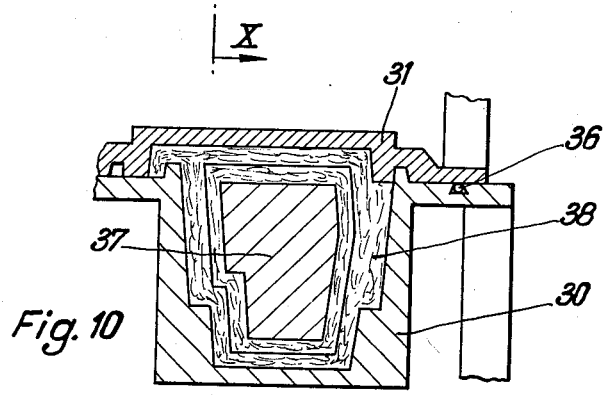

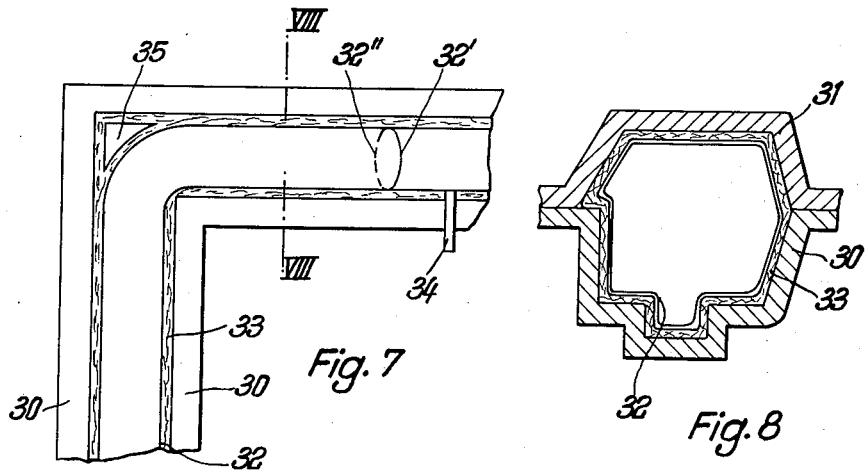
Fig. 7
Fig. 8
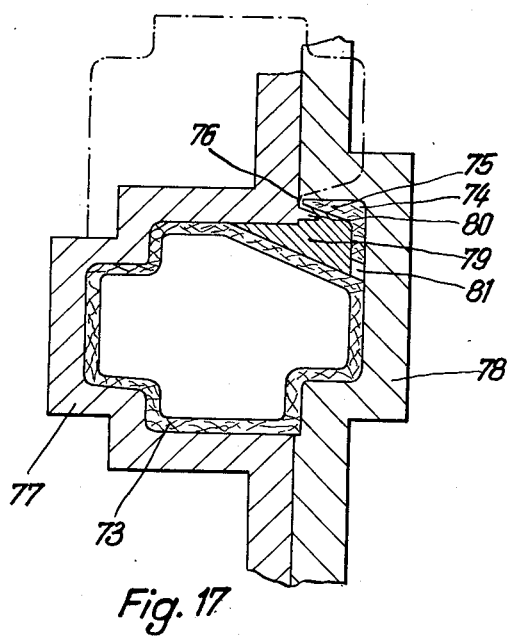
Fig. 17

April 30, 1963  G. A. STYRA  3,087,207
FRAMES, SPECIFICALLY WINDOW-FRAMES, DOOR-FRAMES, AND KINDRED
FRAMES, AS WELL AS APPARATUS AND PROCESSES
FOR THE MANUFACTURE THEREOF
Filed Oct. 31, 1957  7 Sheets-Sheet 5
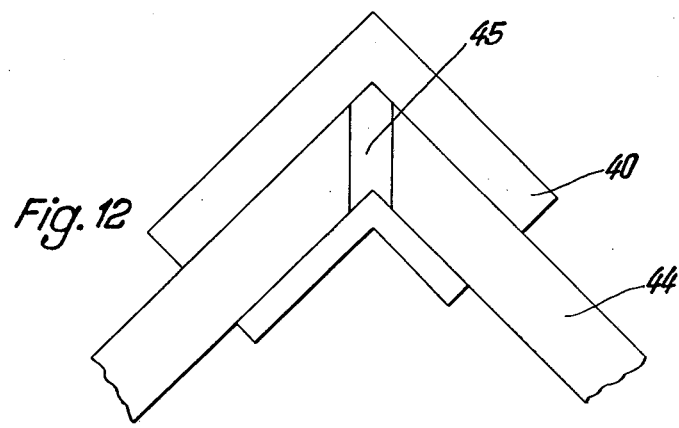
Fig. 12
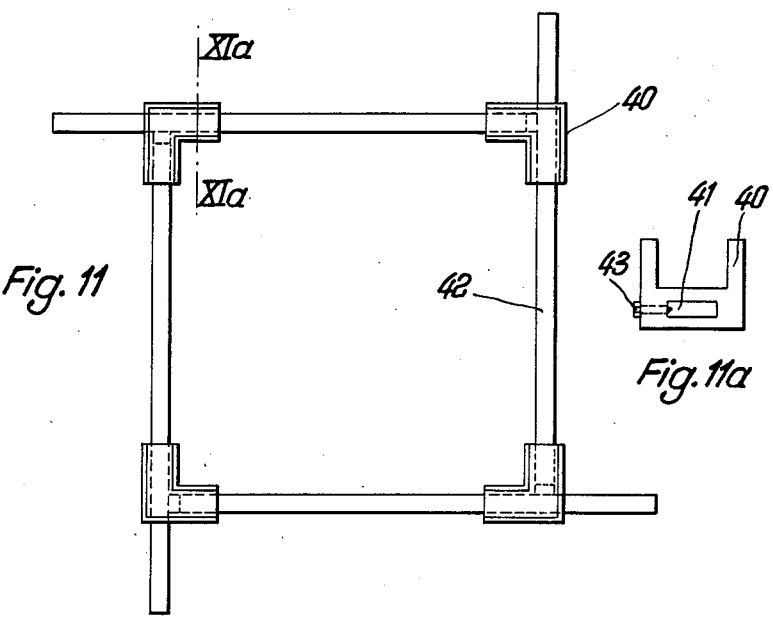
Fig. 11
Fig. 11a
Inventor:
G.A.Styra April 30, 1963 G. A. STYRA 3,087,207
FRAMES, SPECIFICALLY WINDOW-FRAMES, DOOR-FRAMES, AND KINDRED
FRAMES, AS WELL AS APPARATUS AND PROCESSES
FOR THE MANUFACTURE THEREOF
Filed Oct. 31, 1957  7 Sheets-Sheet 6
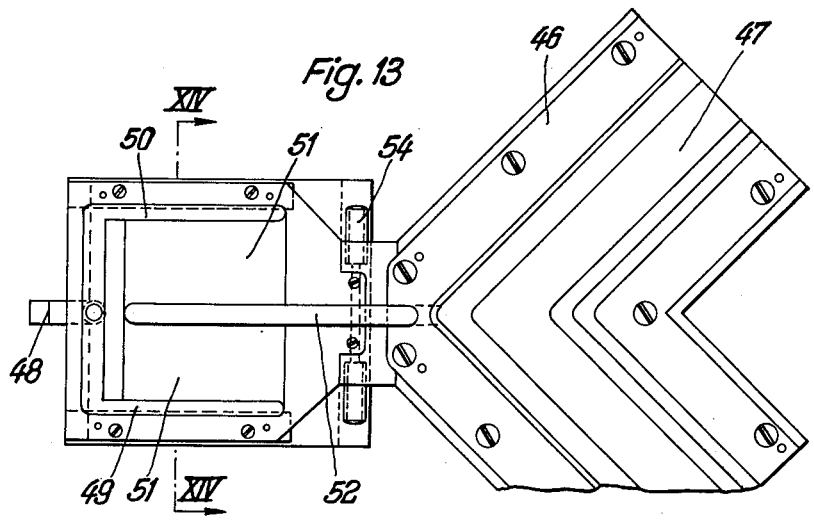
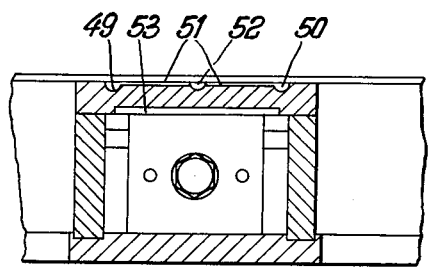
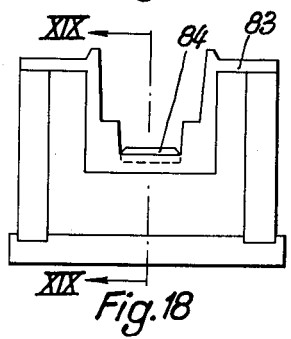 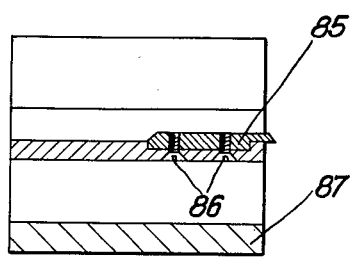
Inventor:
G. A. Styra
By Glascock Downing Seebold
Attys.

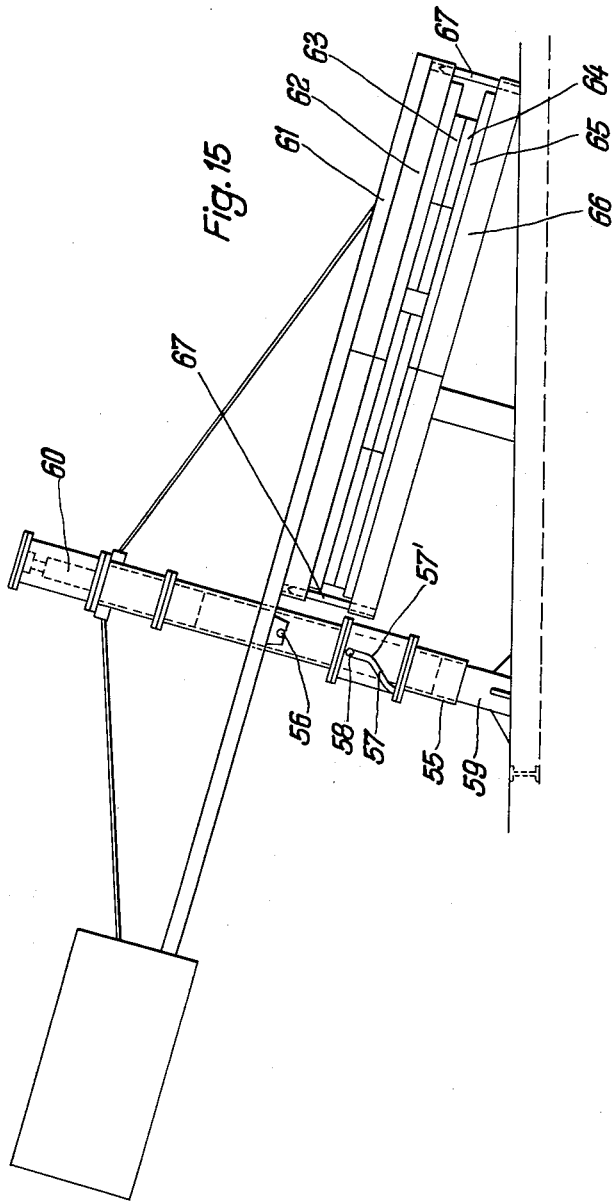

United States Patent Office 3,087,207
Patented Apr. 30, 1963

3,087,207
FRAMES, SPECIFICALLY WINDOW-FRAMES, DOOR-FRAMES, AND KINDRED FRAMES, AS WELL AS APPARATUS AND PROCESSES FOR THE MANUFACTURE THEREOF
Gerd Adolf Styra, Nurnberg, Germany, assignor to Ilse Behrens, Nurnberg, Germany
Filed Oct. 31, 1957, Ser. No. 693,682
Claims priority, application Germany Nov. 2, 1956
7 Claims. (Cl. 20—11)

This invention relates to a frame, specifically a window frame, a doorframe, and the like. It proposes first of all a frame of plastic, which is reinforced. The reinforcement gives to the frame considerable stability and permits the saving of plastic material, which is for an economical production of essential importance. The frame may consist of a polyester resin, which is reinforced by a glass fibre skeleton. Wooden laths or profilized rods of light metal may be used as reinforcements. For example one may use square tubes, which are plugged at the open ends.

It has been proven that such frames meet all requirements and can be produced economically.

The invention proposes specifically for the plastic frame, preferably consisting of a polyester resin, that is a blown up tube, covered with glass fibre, be employed as a skeleton. A polyethylene tube may be suggested, which has to be rendered adhesive and covered with glass fibre. Also it is possible to pull over this polyethylene tube an additional tube covered with glass fibre. Surprisingly, it has been proved that in this manner a considerable saving of plastic material without diminishing the stability of the frames may be effected. In blowing up the inner tube, the tube fits itself largely to the contours of the form, while the glass fibre is placed on the inner side of the form, and the glass fibre becomes saturated with the plastic during the blowing up process. This above mentioned saving of plastic material is of essential importance for an economical manufacture of the frames.

It is advisable to insert inside on the places of the outside corners triangular blocks, as otherwise the blown up tube does not fit close enough to the contours of the form of these places.

Furthermore, the invention proposes the use of foam plastic, of which the suface will be covered by means of an adhesive with glass fibre. Furthermore, the skeleton tube may have circular indentations, which run preferably at right angles to the longitudinal axis. This gives to the finished frame in its plastic part an inner shape similar to a bamboo stick, which fact insures an exceptionally high stability.

The invention concerns further apparatus and processes for the manufacture of like frames. The aim is the manufacture at the lowest possible production cost, whereby, above all with the least additional expenditure, frames of the most divergent size and shape may be produced. It is known that in present day architecture the size and shape of window frames are usually chosen quite arbitrarily and must be supplied according to specifications.

In other words, the building industry demands a supply of window frames of the most divergent sizes and shapes, naturally at the lowest possible price.

To solve this problem, the invention proposes a form with adjustable cornerpieces, which can be placed at the required distances. These cornerpieces may be joined by sections of varying lengths. A specified number of frame parts suffices to assemble forms for any desired size and permits the manufacture of series of like sized frames. When a frame of a different size is wanted, only the distances between the cornerpieces have to be adjusted. Of course one may switch in this way from a rectangular to a square form and vice versa. Therefore a different frame size does not require an entirely separate form. This, of course, is of decisive importance as the cost of the forms is an essential factor in total production costs. The assembly of form parts to specification does not demand craftsmanship of a high order and unskilled labor may be trained for the manufacture of the same.

Also, cornerpieces of divergent forms like a T or a cross form may be designed.

One needs therefore for each wanted kind of profile only one corresponding form part. One may get along with cornerpieces, which have 10 cm. inside side length and have longitudinal side lengths from 10 to 20 cm. graded with 1 cm. difference and further use length sections of 30, 40, 50, and 100 cm. With such set one may, starting with the minimum size of 30 x 30 cm., produce any size frame, which has the length and width specified in whole centimeters.

Figure 5:
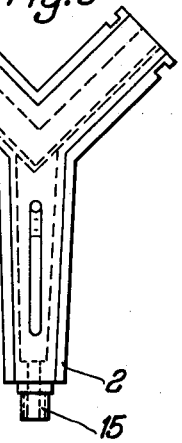
Figure 1:
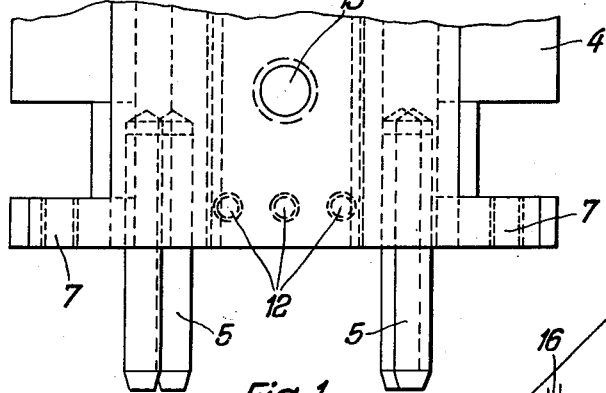
Figure 3:
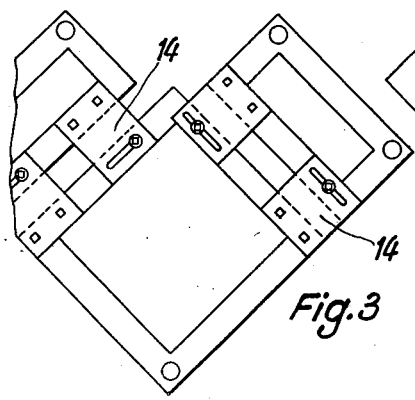
Figure 4:
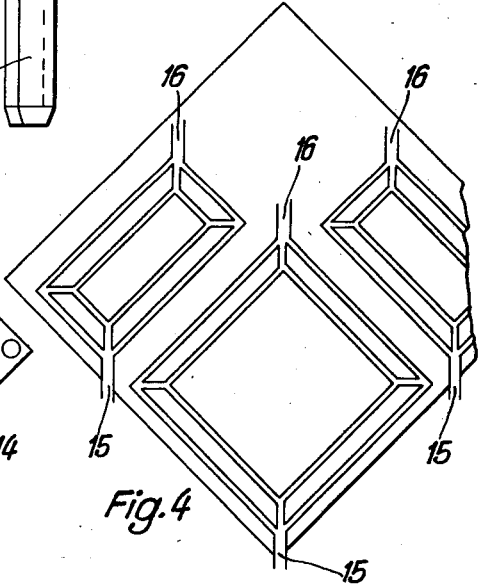

Other advantages of the invention can be learned from the samples shown in the drawings as follows:

FIG. 1: a surface view of a length section of a form.
FIG. 2: a front view to FIG. 1.
FIG. 3: several forms joined together in one setup.
FIG. 4: form parts and the arrangement for their filling.
FIG. 5: cornerpiece, and arrangement for filling thereof.
FIG. 6: a device for lifting and setting in place of upper section.
FIG. 7: a surface view of a lower section of form with tube reinforcement.
FIG. 8: a crosscut thru FIG. 7 along line VIII—VIII in FIG. 7, whereby the upper section has been added.
FIG. 9: a longitudinal crosscut thru a form with a different type of reinforcement.
FIG. 10: a crosscut along line X—X in FIG. 9.
FIG. 11: a surface view of the cornerpieces of a lower section of a form with cornerpieces joined by rails.
FIG. 11a: a crosscut along line XIa—XIa of FIG. 11.
FIG. 12: a corner joint as in FIG. 9 with profilized pieces inserted.
FIG. 13: a part of the suction line on an upper cornerpiece.
FIG. 14: a crosscut along line XIV—XIV in FIG. 13.
FIG. 15: another development of the lifting device.
FIG. 16: a clamping device for a pressure tight joining of form parts.
FIG. 17: shows in a crosscut thru a form a means for adding a so called weather moulding to a window frame.
FIG. 18: a crosscut thru a lower section of a form.
FIG. 19: the part of a frame with hinges.

The form consists as shown in the drawings of cornerpiece and length sections. One cornerpiece is shown as reference character, in FIG. 5 and is furnished with a connecting piece for filling in plastic, which will be described in detail in the following.

A length section is shown in FIGS. 1 and 2 wherein the lower part is designated as 3 and the upper part is designated as 4. Naturally each cornerpiece consists of an upper and a lower part too.

The length sections and cornerpieces are joined together by adjustment bolts 5. The drilled holes for the bolts are marked 6.

Further threaded holes 7 are provided to screw form parts together.

The form lies on a platform, which can be magnetized. When current is applied to the electro-magnetic windings, the form is held immovably to the platform. To this purpose the upper section 4 overlaps with its legs 9 the lower section. Also the lower surface 9' of the legs 9 are separated only by about 1/10 mm. from the magnetic platform 8. Thus, the upper section is also held in place magnetically and in spite of the small gap, a faultless tight locking is achieved.

Therefore, specific measures for tightening the form parts together are not needed. This is of importance because on this same platform, forms of the most divergent sizes should be quickly arrangeable. Also the magnetic holding device for the form parts after the completion of each workpiece a most simple and quick unfastening of the form parts.

The inside surface 9″ of the legs 9 tapers conically, thereby facilitating the placing of the upper section on the lower section of the form in the required close fit.

The diagonally hatched space 10 in FIG. 2 is filled with a polyester resin. 11 is a reinforcement, a skeleton tube, or something similar, which is kept in position by holding bolts 12.

More threaded holes may be provided in the form parts, these holes serving to fasten knotted sheet metal 14 (see FIG. 3). Hence, several forms may be connected in one unit, which can be filled with plastic in one work-process, although it is advisable to provide for each form a separate connection for the filling with plastic. If it seems desirable, one can therefore manufacture at one and the same time a window frame and two window wings for instance.

The filling with plastic is accomplished by means of a well known vacuum process. For this purpose, according to the invention, the magnetic platform is brought to a slanting position as shown in FIG. 6. The plastic according to the sample a polyester resin, is fed at the lower end of each form (see 15 in FIG. 4). On the upper end (16 in FIG. 4) the connection for the suction line is shown, to which a vacuum pump is attached. Through the placing of feed and suction points on opposite corners of the form a faultless filling with the plastic is insured. The slanting position (preferably 45°) of the magnetic platform and therewith of the form serves the same purpose.

The tube 15 (see also FIG. 5) serving as feed line for the plastic is surrounded in a way, which is not shown separately, by a circulating cooling liquid. This cooling liquid may be present in a second tube enclosing the first.

In the connecting piece there may be, in a way not separately shown, a photocell, which is installed inside a glass container in such way, that, after the completed filling of the form with plastic, the filling process will be shut off automatically.

To lift the upper section of the form riggers 17 (FIG. 6) serve, which are arranged around a column with height extension. Each rigger pivots around the column and can be adjusted to a desired position. The riggers have rails on the lower side, which are provided with a length wise sliding mechanism and have adjustable holding bolts, which may be placed and locked in the threaded holes 13. This locking may be effected electro-magnetically. The bolts may also be grooved.

The entire work process may be self operating by electric impulses, which effect the setting in place of the upper section of the form as well as the other work operations. Also the automatic locking of the holding bolts 20 in the threaded holes 13 is thereby possible. Correspondingly, the magnetizing and demagnetizing of the magnetic platform is possible in the same way. The lower sections of the forms stay on the magnetic platform during the entire manufacturing process.

Before setting the upper section of the form in place the previously cut to size reinforcements 11 are fitted into the lower section of the form.

The lifting device for the upper section of the form is mounted on a pivoting support-rail 21 with sliding-rails 22, while by means of a bolt, not shown in the drawings, engaging and locking in the support rails, this lifting device, after having been pivoted to the right position, is kept there.

After the upper section of the form is set in place, the lifting device is pivoted out and then the intake by suction of the plastic takes place with the magnetic platform having been slanted (FIG. 6) previously. Following this, the hardening of the plastic is effected by means of an infra red radiator 23. With the hardening process finished, the infra red radiator is switched off and then the magnetic platform is lowered. The lifting device for the upper section is moved again to the magnetic platform and through a row of openings the forms are sprayed with a cooling liquid. The lifting device lowers itself onto the magnetic platform and, after engaging and locking the holding bolts and with the electric current turned off, the upper section is lifted and the lifting device moves to the side. Then the impulses are stopped. The finished parts, for instance a window frame with several window wings, can be taken out. Thus the advantage accrues that, with the lifting device moved to one side, the finished parts can be placed on a conveyor. As the polyester resin is being cooled in the lead pipes, the production process can be repeated at once. That means, that, after the forms are emptied, by switching on the electric impulses the next frame or set of frames may be made.

In FIGS. 7 and 8 reference character 30 indicates the lower section and in FIG. 8 31 indicates the upper section of the form. At the start of the production process a polyethylene tube 32 is placed in the lower-section 30. This tube is covered with glass fibre 33 or has a second tube with glass fibre covering pulled over it. The tube 32 has a valve 34, which passes out through the form and can be tied up after the inflation of tube 32.

Prior to the inflation of the tube, corner blocks 35 of a roughly triangular form are placed into the corners of the form on the outside of the tube. These blocks may consist of foam plastic, balsa wood, or something similar, and they fit exactly into the corners, which would not be filled out completely by the inflated tube. Care has to be taken in placing these blocks to leave a small space between them and the form, this place being filled by the plastic.

The inflation of tube 32 takes place after the upper section of the form 31 is set in place, and it has been shown that the inflated tube with glass fibre covering fits itself so completely to very complicated profiles, that the filled in plastic saturates the glass fibre evenly and a uniform coat of plastic finally surrounds the tube.

The tube to be inserted is somewhat longer than the middle length of all form parts added together, therefore, as indicated in FIG. 7, one end 32′ overlaps the other end 32″ slightly. Therefore this junction is assured to have an even thickness of plastic wall.

The insertion of the tube is a simple operation, which may be done by unskilled labor.

In FIGS. 9 and 10 again 30 and 31 indicate the lower section and upper section of the form. Between both sections a rubber gasket 36 may be provided, which will prevent an oozing out of plastic during the filling process and which is arranged on the left and right i.e. on both sides of the form.

In this model the reinforcement consists of a foam plastic skeleton 37, which has an adhering glass fibre covering 38. In the same way as in the model shown in FIGS. 7 and 8 the glass fibre layer fills the space between the reinforcement and the inside of the frame and becomes during the filling process completely saturated with plastic. One may hereby as in the a/m. model do without special holding bolts for the reinforcement, as the skeleton or tube through its glass fibre covering is kept in a central position inside the form.

The reinforcement 37 is provided with indentations 39, which give to the produced coat of plastic a bamboo like structure. This provides a very high stability, which permits a correspondingly thinner coat of plastic resulting in a saving of material and costs.

The above mentioned idea, to effect the most economical production of the frame through a form, of which the distances between the cornerpieces are adjustable, has been developed further in FIGS. 11, 11a, 12. The corner pieces 40 have openings 41, into which rails slide, which are adjustable by means of screws 43. The cornerpieces 40 can in this way be moved and adjusted according to the given specification for the frame. Following, previously shaped and cut to size profilized rods or laths 44 are placed into the corner pieces. The profilized rods or laths are cut to a size, which allows at their junction points 45 (corner joints) a small intervening space. In this manner plugged tubular rods may also be used. Succeeding this, a similar arrangement consisting of cornerpieces 40 and rails 42 is made for the upper section of the frame, which has openings in the corner pieces over the junction points 45, where plastic is poured in to bind the profilized rods 40 solidly together. This process also is remarkable for its simplicity.

The self operating finish of the filling process, like suggested above by a photocell, may be effected through a less sensitive device. To this end, the suction piece 46, outside of the space 47, provided for the workpiece, has a heated narrow passage for the plastic. The connection 40 to the vacuum pump has two diameters 49, 50, which are connected only by an intermediate plan like crosscut 51 with the opening 52 leading into the form. This graduated section has, as shown in FIG. 14, in its profile less height than the openings 49, 50, and 52 and is heated by plate 53. As the plastic, which is hardened by heat, is sucked up, it finally reaches, after the form is filled completely, through the opening 52 the space 51 and solidifies here at once, because this spot has firstly a smaller diameter and secondly is heated. Therewith the filling process is self operatingly finished and, after removal of the upper section, the hardened plastic plug may be removed. To prevent a spreading of the heat produced by heating plate 53 to the form, the opening 52 is surrounded by a circulating cooling liquid, which is supplied through line 54.

To simplify the operation of the lifting device for the upper section, it is fastened in a variated design to pipe 55 by being hinged on the bolt 56. The pipe 55 has a slit guide 57, into which a bolt 58 of a column 59 engages. Pipe 55 and column 59 slide from and toward each other by means of an hydraulic cylinder 60.

In FIG. 15 the lifting device 61 with magnetic plate 62 and upper section of form 63 are in locked position on lower section of form 64 with magnetic plate 65 and support 66. When the pipe 55 is moved upward, the bolt 58 slides at first into the part of the slit 57, which runs in the longitudinal direction of the column. When the bolt 58 has reached the bend 57, the upper section has been lifted sufficiently high from the lower section and then, because of the now slanting run of the slit guide 57, the upper section is swung around about 90°. Then the workpiece may be taken out of the lower section and be placed on the conveyor.

The moving in of the lifting device is effected in the reverse manner. Thus, the bolts 67, which are arranged on plate 66 and which engage in corresponding holes of plate 62, serve to fix the exact position of the upper on lower section.

Above, for a pressure tight joint of lower to upper section, a screw arrangement had been suggested. According to FIG. 16 one may provide for the sides of the form parts, near the facing plates 68, bolts 69, which are gripped by an eccentric locking-plate 70 and, on turning of plate 70, press and hold the form parts together. To do this one uses an hexagonal wrench on the hexagonal key. To secure the eccentric locking-plate 70 in position, the bolts have keylike indentations 72.

The invention provides further a weather protection by a weather moulding, which is attached to the lower horizontal piece of a window frame and which naturally will be later on on the outside of the frame.

To this end, the crosscut of the frame in FIG. 17 is indicated 73, the weather moulding is indicated 74 and extends in height to reach later the lower edge of the window wings. Towards the window wing, which is shown in FIG. 11 point hatched, it has a lengthwise running promontory 75, on the face of which later the window wing will touch. To drain rainwater running down the window panes, holes 81 are provided.

In FIG. 17 the crosscut of the frame is shown together with the form consisting of parts 77 and 78. To produce weather moulding 74 and 75 a filling-piece 79 is provided, which is placed by means of a lengthwise groove over promontories or over a holding rail 80 on the upper section of the form prior to the filling process. Following the finished filling process and after separation of form parts 77, 78, the frame with filling piece 79 is first slid off holding rail 80 and then the filling piece can be removed, leaving frame 73 with weather moulding 74, 75. The filling piece itself may be case out of zinc, which may be recast after finishing a series of frames to other required sizes. The form itself can be heated for the hardening of the plastic by means of steam, hot water, or electricity. In this case the infra red radiator is of course not needed.

Form 83 in FIG. 18 has a promontory 84 to cause on the finished product, as shown in FIG. 19, an indentation, into which a hinge 85 can be placed and fastened with screws 86. 87 marks the finished frame or wing.

Therewith provision has advantageously been made, that in a series of like frames the indentations for the hinges are situated in the same places. This means, that a wing for an already installed frame can be replaced with indentations for the hinges in the required places. In a row of windows the wings may be taken off and in replacing every wing will fit every window.

Claims of patent:

1. A self-contained frame adapted to fit into an opening formed in a building structure, comprising a body of polyester resin, an inflatable polyethylene reinforcing tube, and a glass fiber tube surrounding said reinforcing tube, said tubes being embedded in the body of the polyester resin.

2. The self-contained frame as set forth in claim 1; wherein the said reinforcing tube includes a valve.

3. That method of constructing a plastic frame of the type used in building structures which comprises the step of fitting an inflatable polyethylene reinforcing tube within a glass fiber tube, placing the thus assembled tubes into a molding zone, inflating the reinforcing tube to substantially fill the molding zone, and forcing a mass of polyester resin into the molding zone thereby providing a unitary frame.

4. That method of constructing a plastic frame of the type used in building structures which comprises the steps of inserting an inflatable polyethylene reinforcing tube within a glass fiber tube of substantially the same diameter, placing the thus assembled tube into a molding zone whereby the contour of the thus assembled tube forms the outline of the frame, and injecting a mass of polyester resin into the molding zone to saturate the glass fiber tube thereby providing a unitary frame.

5. A frame adapted to fit into an opening formed in a building structure, comprising a body of polyester resin, a foam-plastic reinforcement, and a glass fibre layer covering the surface of said reinforcement, said reinforcement and said layer being embedded in the body of the polyester resin.

6. A self-contained frame adapted to fit into a opening in a building structure comprising a body of polyester resin, a reinforcement insert of small specific weight and insensitive to moisture within said body, and a glass fiber element surrounding and insert with said insert and glass fibre element being embedded in the polyester resin.

7. A self-contained frame as claimed in claim 6, in which said insert and element are provided with grooves extending transversely of the longitudinal axis of the insert and element.

References Cited in the file of this patent

UNITED STATES PATENTS

| | | | |
|---|---|---|---|
| 2,311,182 | Bohn | Feb. 16, | 1943 |
| 2,430,081 | Roberts et al. | Nov. 4, | 1947 |
| 2,690,769 | Brown | Oct. 5, | 1954 |
| 2,698,460 | Amo | Jan. 4, | 1955 |
| 2,722,962 | Hampshire et al. | Nov. 8, | 1955 |
| 2,753,603 | Strawther | July 10, | 1956 |
| 2,766,806 | Rothermel et al. | Oct. 16, | 1956 |
| 2,768,920 | Stout | Oct. 30, | 1956 |
| 2,801,444 | Lorenian | Aug. 6, | 1957 |
| 2,857,094 | Erwin | Oct. 21, | 1958 |

FOREIGN PATENTS

| 516,148 | Great Britain | Dec. 22, 1939 |
|---|---|---|